(12) United States Patent
Post et al.

(10) Patent No.: US 9,442,866 B1
(45) Date of Patent: Sep. 13, 2016

(54) SELF-ADAPTIVE SOLID STATE DRIVE CONTROLLER

(75) Inventors: Samuel D. Post, Folsom, CA (US);
Eric Anderson, Sacramento, CA (US)

(73) Assignee: Micron Technology, Boise, ID (US)

( * ) Notice: Subject to any disclaimer, the term of this patent is extended or adjusted under 35 U.S.C. 154(b) by 104 days.

(21) Appl. No.: 12/649,954

(22) Filed: Dec. 30, 2009

(51) Int. Cl.
*G06F 12/02* (2006.01)
*G06F 13/16* (2006.01)

(52) U.S. Cl.
CPC ......... *G06F 13/161* (2013.01); *G06F 13/1615* (2013.01)

(58) Field of Classification Search
None
See application file for complete search history.

(56) References Cited

U.S. PATENT DOCUMENTS

| | | | |
|---|---|---|---|
| 7,089,379 B1 * | 8/2006 | Sharma et al. | 711/154 |
| 7,707,366 B2 | 4/2010 | Tagawa | |
| 7,725,622 B2 | 5/2010 | Rubidge et al. | |
| 8,356,127 B2 * | 1/2013 | Hampel | 710/118 |
| 2003/0115403 A1 | 6/2003 | Bouchard et al. | |
| 2004/0259563 A1 * | 12/2004 | Morton et al. | 455/452.2 |
| 2005/0166026 A1 * | 7/2005 | Ware et al. | 711/167 |
| 2005/0223179 A1 | 10/2005 | Perego et al. | |
| 2006/0053308 A1 * | 3/2006 | Zimmerman | H04L 9/0897 713/193 |
| 2006/0069766 A1 * | 3/2006 | Hamilton et al. | 709/224 |
| 2007/0101096 A1 | 5/2007 | Gorobets | |
| 2007/0105576 A1 * | 5/2007 | Gupta et al. | 455/509 |
| 2011/0125977 A1 | 5/2011 | Karr et al. | |

OTHER PUBLICATIONS

Patent Application filed Dec. 30, 2009 in co-pending U.S. Appl. No. 12/650,035, 23 pages.

* cited by examiner

*Primary Examiner* — Charles Rones
*Assistant Examiner* — Ryan Dare
(74) *Attorney, Agent, or Firm* — Brooks, Cameron & Huebsch, PLLC

(57) ABSTRACT

A memory device may comprise circuitry to determine a number of channels through which to transfer information to adjust between latency and throughput in transferring the information through the channels of a memory port.

21 Claims, 4 Drawing Sheets

SELF-ADAPTIVE SOLID STATE DRIVE CONTROLLER

BACKGROUND

1. Field

Subject matter disclosed herein relates to accessing memory devices.

2. Information

Solid State Drives (SSDs) offer many advantages over Hard Disk Drives (HDDs). SSDs provide faster execution, lower power consumption, and are not susceptible to mechanical failures, such as head crashes. Because SSDs are typically based on NAND flash devices, which require the erasure of relatively large blocks of memory before a single bit can be written, such drives exhibit relatively high latency. Nevertheless, such drives may be tailored, at a manufacturing or original equipment manufacturer's facility, to reduce latency as much as possible, often at the expense of the drive's throughput. Unfortunately, a drive's use may vary over time, and low latency operations (a database table update, for example) may give way to operations that would benefit most from high throughput (the transfer of large files for streaming video, for example). Similarly, high-throughput operations may give way to operations that would benefit most from low latency.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Solid state memory organized in channels, such as may be found in a multi-channel solid state drive, for example, may be used to service a variety of requests. Such a request may include read or write requests, may be directed from an application or driver to a controller, and may be best-served by low-latency access to information stored in the memory, by high-throughput access to the information or, alternatively, by an intermediate approach that balances throughput and latency. Because different requests may be best suited for different approaches (high-throughput or low-latency, for example) solid state memory controllers that are tailored to emphasize one approach (high-throughput, for example) operate disadvantageously with another (low-latency, for example). In an example embodiment, a solid state memory controller may include self-adaptive circuitry that adjusts to one or more characteristics of one or more requests to thereby accommodate high-throughput, low-latency, or an intermediate form of operation. However, this is merely an example embodiment, and claimed subject matter is not limited in this respect.

Figure 1:
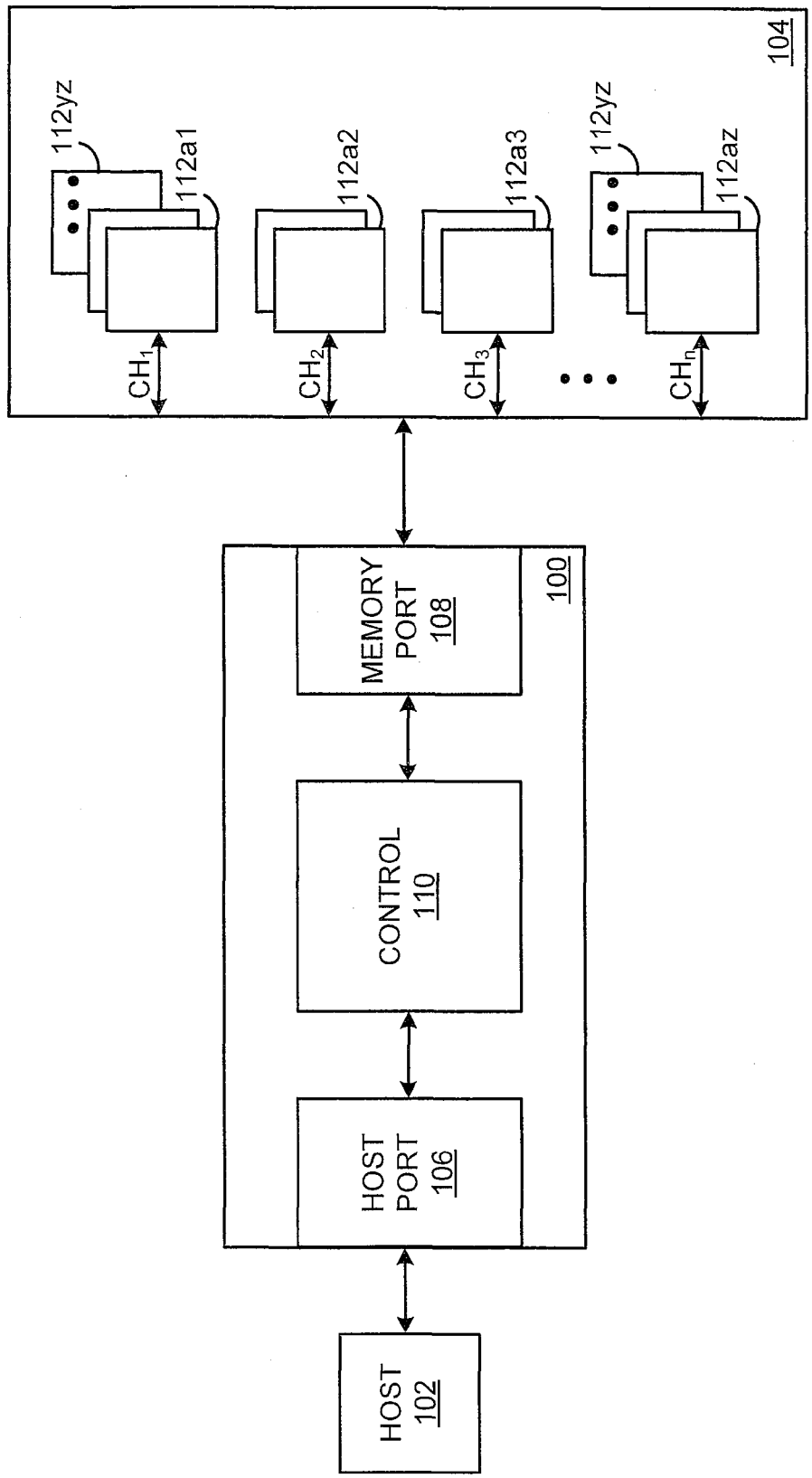
FIG. 1 is a schematic block diagram of a system that may employ a controller in accordance with an embodiment.

FIG. 1 shows an illustrative embodiment of a solid state memory controller 100 which is coupled to a host processor 102 and memory array 104, respectively, through host port 106 and memory port 108. Solid state memory controller 100 may be a Sold State Drive (SSD) controller, for example. Solid state memory controller 100 includes control circuitry 110 to monitor requests, such as read or write requests received from host 102, to determine whether a request, or string of requests, is to be served by low-latency or high-throughput storage and retrieval. After making such a determination control circuitry 110 may service requests through memory port 108 to a memory array 104. In an illustrative embodiment, memory array 104 includes memory devices 112$a$1-112$yz$ arranged in n channels, CH1-CHn. Channels CH1-CHn may be implemented as known channels, such as Serial Advanced Technology Attachment (SATA) or Peripheral Component Interconnect Express (PCIE) channels, for example. Another channel (not shown) may comprise an interface to individual controllers associated with channels CH1-CHn in accordance with the principles of the claimed subject matter. In such an embodiment one or more of the channels CH1-CHn may have associated with it a controller (not shown) that provides queuing and other I/O processes. In other embodiments, a "channel" may comprise any physical structure capable of transmitting information between a memory device and another device. Alternatively, such a channel may comprise a virtual channel for transmitting information between a memory channel and another device. Of course, these are merely examples of a channel discussed for the purpose of illustration, and claimed subject matter is not limited in this respect, Control circuitry 110 may service a low-latency request by distributing information associated with such a request over a relatively high number of memory channels and service high-throughput requests by distributing information associated with such a request over a relatively low number of memory channels in an illustrative embodiment. Highest-throughput requests may engage only a single memory channel, and lowest latency requests may engage all memory channels, for example. Overhead associated with setting up a single channel may be less than that associated with setting up a plurality of channels. Consequently, throughput may be greater if a single channel is employed for a given request, although latency may be less if multiple channels are employed to service a request. Such overhead may include channel initialization, determination of data location, channel availability, bus arbitration and availability, and organizing a command queue, for example. Memory port 108 may be adapted to communicate with a memory array 104 located within the same integrated circuit as solid state memory controller 100 or located in one or more separate integrated circuits, for example.

In an illustrative embodiment, memory devices 112$a$1-112$yz$ may be implemented as nonvolatile memory devices that allow for fine-grained access. In a particular example, Phase Change Memory (PCM) memory devices are such devices. However, this is merely an example of a nonvolatile memory device having fine-grained access capability that may be used and claimed subject matter is not limited in this respect. In particular embodiments memory cells within PCM memory devices may be addressed in relatively small groups, such as word, byte, or even bit. Such fine-grained access is contrasted with a very course granularity of access afforded by such conventional non-volatile memory devices as NAND flash memory devices, which may be accessed in relatively large blocks. A further advantage of PCM devices is that, unlike flash devices, the memory cells may be directly over-written. Flash devices may require that the contents of an entire block be copied out, the block erased, the old contents revised to reflect new information, then the block rewritten with the revised data. As a result, PCM devices may feature substantially reduced latency in comparison with flash devices. A self-adaptive memory controller capable of adjusting latency and throughput may take particular advantage of memory devices such as PCM devices, for example. That is, a solid state Memory controller 100 in accordance with an embodiment may capitalize on low-latency attributes of nonvolatile memory devices such as PCM memory devices by adjusting the distribution of information associated with a request to a plurality of channels, for example. As will be described in greater detail in the discussion related to the following figures, control circuitry 110 may include self-adaptive circuitry to monitor requests from a host 102, and adjusts execution of such requests to yield lower latency (for a database table update, for example) by distributing requests across more channels within a memory array 104, or to yield higher throughput (for streaming video, for example) by distributing requests to a lesser number of channels.

In an embodiment in which memory devices 112yz comprise PCM devices, memory devices 112yz may include single level cells (SLC), multilevel cells (MLC), or a combination of both, and may be hierarchically organized into banks of memory cells. A bank of memory cells may have its own chip enable signal terminal associated with it. Solid state memory controller 100 may access more than one bank in a PCM device at the same time, and may access different banks in different PCM devices at the same time. solid state memory controller 100 may engage a plurality of memory channels CH1-CHn simultaneously and thereby reduce the latency of an SSD that includes solid state memory controller 100. In particular implementations, a greater number of channels CH1-CHn employed for a given request from a host may lower a latency associated with the execution of the request. Likewise, a fewer number of channels CH1-CHn associated with the execution of such a request, the greater the throughput.

A solid state drive that includes solid state memory controller 100 may include a memory array 104 in which a channel from among CH1-CHn may be configured to receive one or more control signals, such as chip enable signals. In an illustrative embodiment, chip enable signals of PCM memories associated with a given channel may be activated in concert. In an illustrative embodiment each PCM device 112yz may include a command/address/data multiplexed interface for the interchange of data, address, and control signals through corresponding input/output pins. A PCM device 112yz may be connected to a separate channel CH1-CHn. Alternatively, a plurality of PCM devices 112yz may be connected to a channel. A channel from among channels CH1-CHn may include one or more input and output lines, chip select signal lines, chip enable signal lines, write enable, read enable, read/busy output, or reset signal lines, for example.

Figure 2:
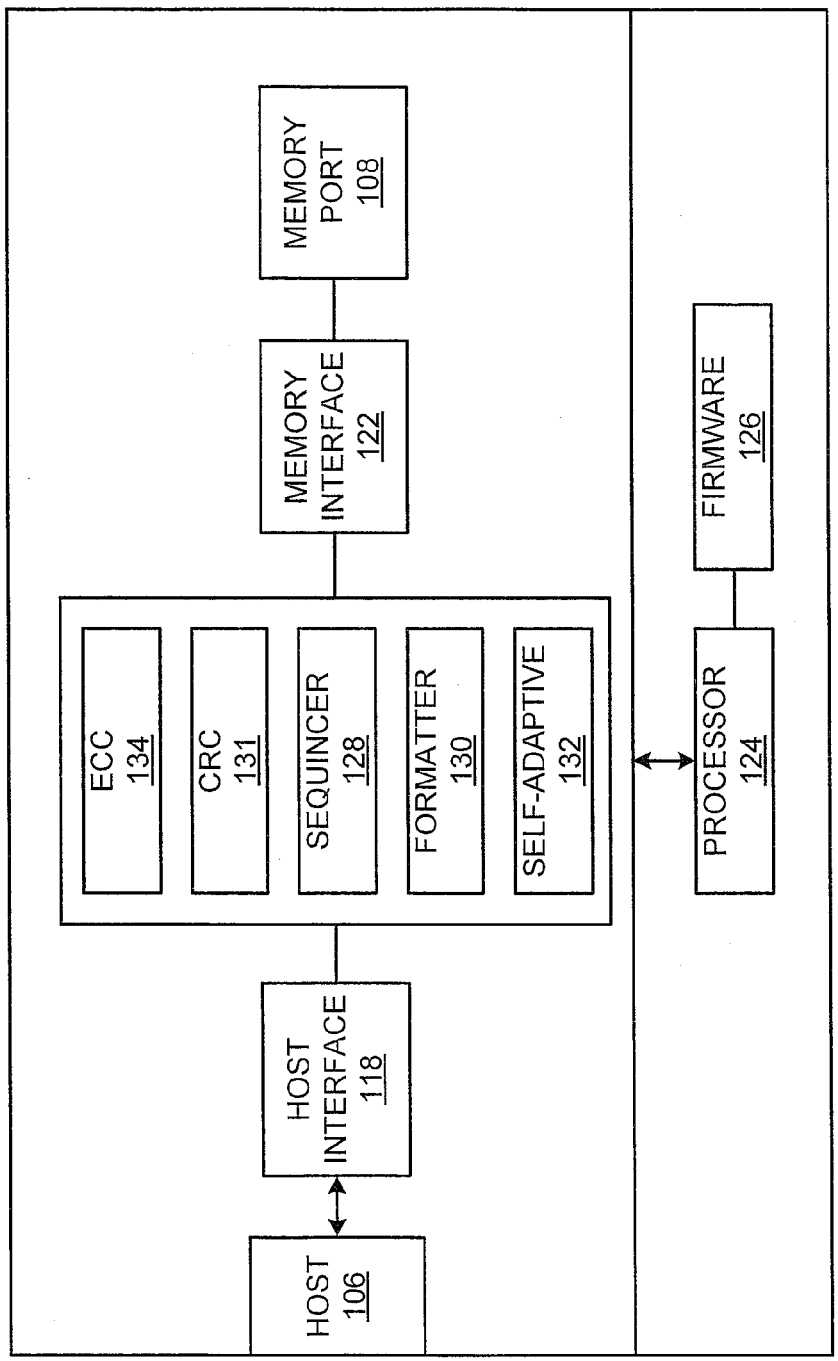
FIG. 2 is block diagram of a controller in accordance with an embodiment.

FIG. 2 is a more-detailed block diagram of an illustrative embodiment of a solid state memory controller 100. In this illustrative embodiment, information may be transmitted between solid state memory controller 100 and a host (such as host 102 of FIG. 1) through host interface port 116 in conformity with host interface 118. Information may be transferred between a memory array (such as memory array 104 of FIG. 1) and solid state memory controller 100 through memory interface port 120 in conformity with memory interface 122.

In this illustrative embodiment, solid state memory controller 100 includes a processor 124 which operates under control of firmware 126. Solid state memory controller 100 may also include sequencer 128, formatter 130, cyclic redundancy check (CRC) circuitry 131, and error correction code (ECC) circuitry 134. CRC circuitry 131, ECC circuitry 134, sequencer 128, and formatter may operate to detect and correct errors, and to format and store information in a memory array 104, for example. However, these are merely examples of particular information storage and retrieval formats that may be implemented, and claimed subject matter is not limited in this respect. Host interface 118 may incorporate features of, or comply with, a standard interface such as, for example, a Serial Advanced Technology Attachment (SATA) interface or a Parallel Advanced Technology Attachment (PATA) interface. Host interface 118 may include one or more registers in which operating commands and addresses, for example, from host 102 may be temporarily stored. Host interface 118 may communicate a request (a write or read command, for example) from host 102 to processor 124 based on information stored in register(s). Processor 124 may be implemented in a variety of technologies, architectures, and levels of complexity.

Self adaptive circuitry 132 may include registers and tables employed by processor 124 to map information from a host 102 into a memory array 104. Information received from a host 102 may be addressed in the form of logical block addresses supplied by a driver, for example. In various embodiments, self adaptive circuitry 132 may include all or part of processor 124 or may employ a separate processor, for example. Self adaptive circuitry 132 may monitor requests received through host interface 118 and may determine a particular gradation of low-latency or high-throughput memory access the request is best-served by and logical block addresses associated with the request one or more channels within a memory array may be mapped accordingly. Logical blocks of information associated with high throughput operations, such as streaming video, may be mapped into one or, depending upon the volume of associated information and volume of memory associated with channels in an associated memory array, a few channels. Mapping information may be stored in a table, such as a formatting table, for example.

Figure 3:
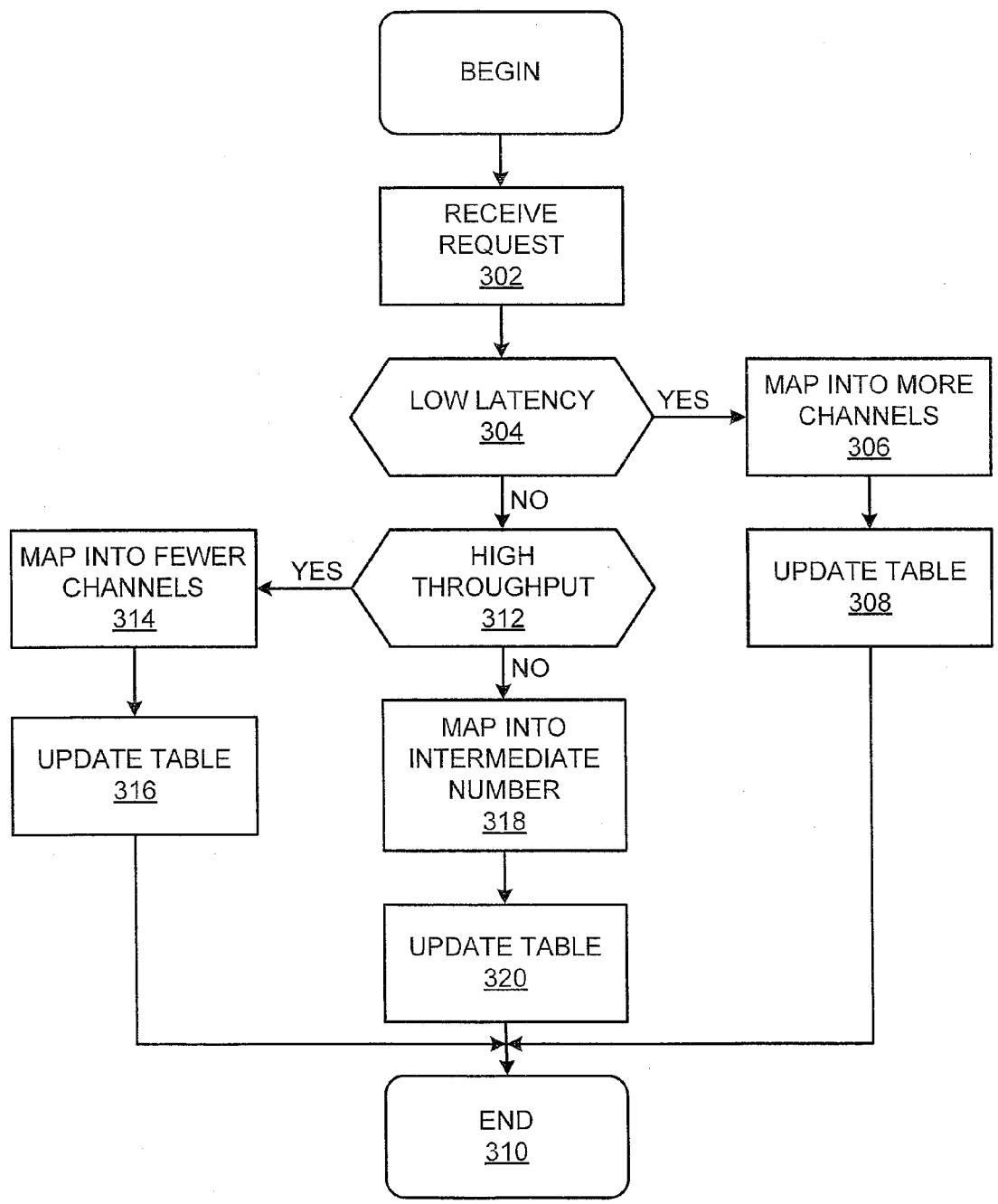
FIG. 3 is a flow chart depicting an illustrative sequence of an embodiment of a process.

A process of determining an appropriate level of parallelism in storing information into a multi-channel array in accordance with a particular example implementation is described in greater detail in the discussion related to FIG. 3. In an illustrative embodiment, self-adaptive circuitry 132 may include circuitry to recognize control information from a driver or file system that aides self-adaptive circuitry 132 in determining whether to employ low-latency or high-throughput storage, or gradations in between. Such control information may be in the form of a header entry inserted by a file system, for example, which may indicate that the associated request is suited for low latency or high throughput execution, for example.

The flow chart of FIG. 3 depicts an illustrative embodiment of a self-adaptive process for processing memory requests. In one particular implementation, process 300 may be performed, in whole or in part, by an SSD. However, this is merely one particular implementation of process 300 and claimed subject matter is not limited in this respect. At block 302 a solid state memory controller may receive a request. Such a request may take the form of a write request from a host processor, such as host processor 102 described in the discussion related to FIGS. 1 and 2, for example. At 304, a solid state memory controller may determine whether a request received at block 302 is to be serviced by low latency execution. Such a determination may be made, for example, by determining a size of file associated with the request. Here, a relatively small file may indicate that the request pertains to a request to be serviced by low-latency operation, such as a table update. In an illustrative embodiment, a self-adaptive solid state memory controller may establish a threshold level of I/O request below which the request is to be serviced by mapping associated information into memory across a plurality of memory channels.

In accordance with the principles of the claimed subject matter, a variety of parameters may be employed to determine whether a request should be serviced by mapping information across a plurality of memory channels. For example, the frequency of request for a given sector or sequence of requests (for example, a read from logical block address (LBA) is frequently followed by a read from LBA 6, then a write to LBA 7) may be used. Additionally, the extent to which information is revised may be used; frequent, but limited, changes to stored information may be used to trigger low latency operation. The LBA destination associated with a request may indicate that associated information is related to a partition table or file allocation table, for example, and that low latency operation may therefore be advantageous.

If it is determined at 304 that a request should be serviced by a low-latency approach, block 306 maps information associated with the request into multiple memory channels; information is mapped into a greatest number of available memory channels for lowest latency. At block 308 file tables may be updated to reflect storage locations used in the mapping of block 306 and information from the file may be stored in the locations thus-indicated. Process 300 may continue as a component of a larger process in which this sub-process is looped through continuously while a solid state memory controller is operating.

If it is determined that low latency operation is not to be applied in servicing a request block 312 may determine whether high throughput operation is to be applied in servicing the request. If high throughput operation is to be applied, block 314 may map information associated with the request into a limited number of memory channels. As mentioned above, a highest throughput may be achieved with use of a fewest number of channels. At block 316 file tables may be updated to reflect storage locations used in the mapping of block 314, and information from the file is stored in the locations thus-indicated. From block 316 the process 300 proceeds to end in step 310.

Various thresholds may be employed to determine whether high throughput or low latency operation may be employed. For example, if requests are received for greater than a threshold number of sequential sectors, ten in an illustrative embodiment, high throughput, single channel, operation may be employed. Or, if, for example, the number of bytes modified is greater than a threshold percentage (e.g., 50%) of a sector size for greater than a threshold number of accesses (e.g., five), high bandwidth operation may be employed. A database table scan may be served by low latency operation and such a scan may be identified, for example, by a request for a plurality of sectors spaced out at regular LBA intervals. If a request is received for a sector within a threshold time period (e.g., one second) from a previous request, a low latency mode may be employed because a host's operating system is not caching the associated information.

In an embodiment that employs solid state memory which requires more time for a write operation than a read operation, the ratio of read operations to write operations may be employed to determine whether a low-latency or high-throughput mode is to be employed. PCM requires more time for a write operation than a read operation, for example, and in an illustrative embodiment in which PCM is employed, the ratio of read operation to write operations may be employed to determine whether low-latency or high-throughput operation is to be employed. In a system employing such solid state memory and writing greater than a threshold percentage of the time (e.g., greater than 50%), newly-written data may be written in a high bandwidth mode, for example.

In an illustrative embodiment a table may be employed to maintain the low-latency/high throughput status of a sector and if a memory sector is placed in a given mode (e.g., high throughput or low latency), it would remain in that mode until the table is modified. In order to reduce the likelihood that high throughput requests interfere with low-latency requests, in accordance with the principles of the claimed subject matter a queue-ordering process, with low-latency requests placed ahead of high throughput requests, where possible, may be employed. In such an illustrative embodiment, before execution of commands in the queue a controller in accordance with the principles of the claimed subject matter may scan the command list and move low-latency requests ahead of high throughput requests.

If, at 312 it is determined that a request is not to be serviced by high throughput operation, block 318 may map information associated with the request into an intermediate number of memory channels; more than one, but less than all, the memory channels to provide a balance between latency and throughput. At block 320 file tables may be updated to reflect storage locations used in the mapping of step 318 and information from the file is stored in the locations thus-indicated. From block 320 the process 300 proceeds to end at 310.

In accordance with an embodiment, control information may be passed from a file system or driver to an solid state memory controller to aid in the determination of whether a request is to be serviced by low latency (step 304) or high throughput (step 312) operation.

Figure 4:
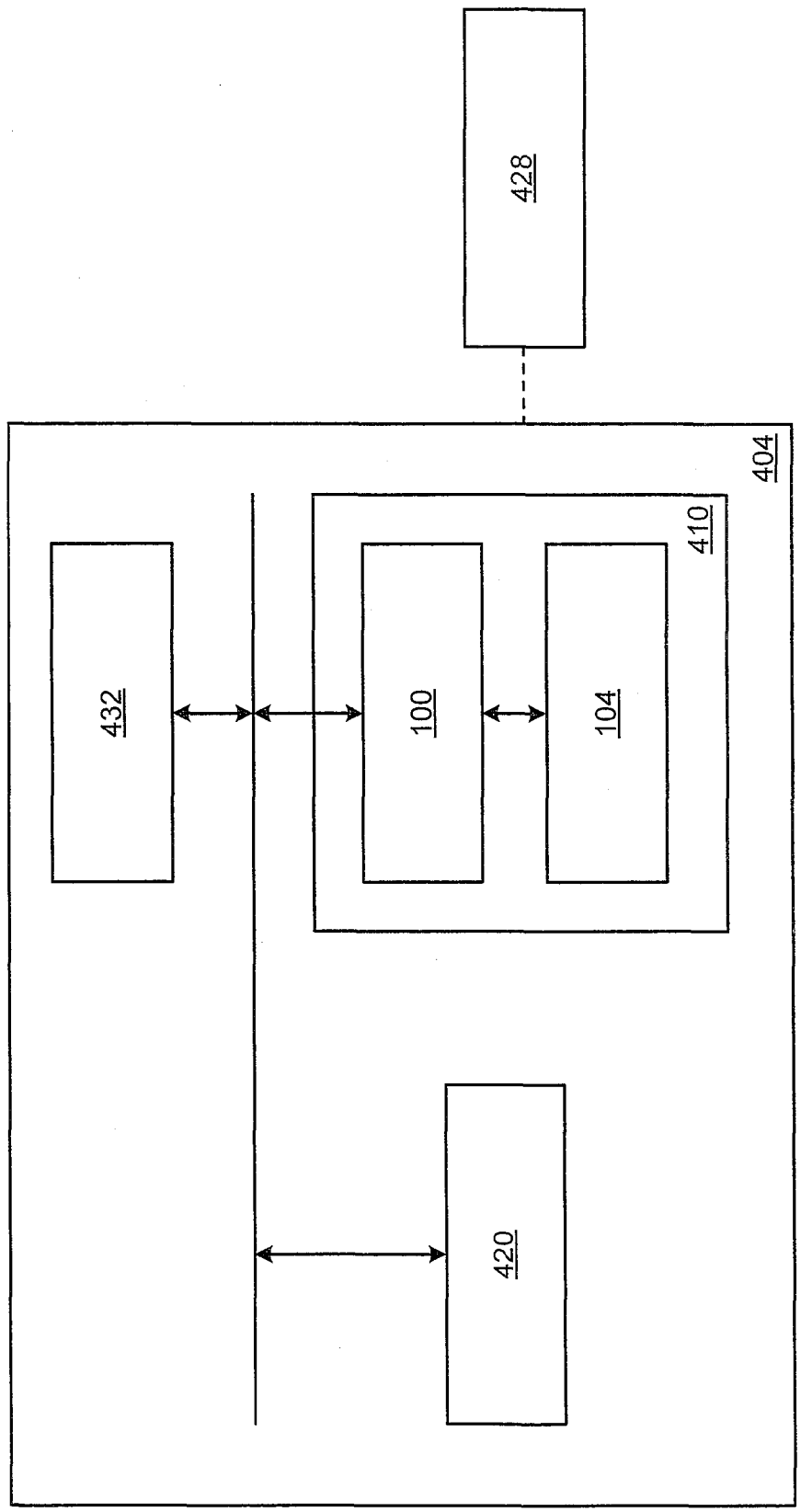
FIG. 4 is a block diagram of a computing system such as may employ a controller in accordance with an embodiment.

The schematic block diagram of FIG. 4 depicts an illustrative embodiment of a computing system 400 that includes a self-adaptive solid state memory controller, such as an SSD controller. Such a computing device may comprise one or more processors, for example, to execute an application and/or other code. Self-adaptive SSD 410 may include a self-adaptive solid state memory controller 100 and a multi-channel nonvolatile memory array 104. By way of example but not limitation, computing device 404 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 400, and the processes and methods as further described herein, may be implemented using or otherwise including hardware, firmware, software, or any combination thereof. Thus, by way of example but not limitation, computing device 404 may include at least one processing unit 420 that is operatively coupled to memory 104 through a bus 440 and a self-adaptive solid state memory controller 100. Processing unit 420 is representative of one or more circuits configurable to perform at least a portion of a data computing procedure or process. By way of example but not limitation, processing unit 420 may include one or more processors, controllers, microprocessors, microcontrollers, application specific integrated circuits, digital signal processors, programmable logic devices, field programmable gate arrays, and the like, or any combination thereof. Processing unit 420 may include an operating system configured to communicate with self-adaptive solid state memory controller 100. Such an operating system may, for example, generate commands to be sent to solid state memory controller 100 over bus 440.

Computing device 404 may include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 432 may include an operatively configured display, speaker, keyboard, mouse, trackball, touch screen, data port, etc.

In the previous detailed description of embodiments, reference is made to accompanying drawings which form a part hereof, and in which it is shown by way of illustration specific embodiments of claimed subject matter. It is to be understood that other embodiments may be used, for example, or changes or alterations, such as structural changes, may be made. All embodiments, changes or alterations, including those described herein, are not departures from scope with respect to intended claimed subject matter.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Flow charts may include steps that may be deleted or otherwise modified and the sequence set forth within a particular flow chart may be modified while keeping within the scope of the invention. Accordingly, the scope of the invention is defined only by reference to the appended claims.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A memory apparatus, comprising:
   a memory array comprising a plurality of memory array channels;
   a memory controller configured to receive a memory request and comprising:
   a memory port for coupling to said memory array, said memory port comprising a plurality of physical memory channels configured to couple to said memory array and to access said memory array with relatively low latency or relatively high latency and with relatively high throughput or relatively low throughput; and
   circuitry to adjust between low latency and low throughput or high latency and high throughput in transferring information through the memory port to said memory array channels of said memory array, wherein said circuitry is capable of determining a number of said plurality of memory array channels through which to distribute said information to service said memory request with low latency and low throughput or high latency and high throughput, said determining being based, at least in part, on a type of said memory request;
   wherein said circuitry is capable of increasing said number of memory array channels through which to distribute the memory request to reduce latency or decreasing said number of memory array channels through which to distribute the memory request to increase throughput; and
   wherein said circuitry comprises circuitry for distributing requests of a length less than a threshold value to a greater number of said memory array channels.

2. The memory apparatus of claim 1, wherein said circuitry comprises circuitry to distribute requests to either a greater or lesser number of said memory array channels according to usage patterns.

3. The memory apparatus of claim 1, wherein said circuitry comprises circuitry to examine incoming requests and to mark an incoming request for distribution among a greater or lesser number of said memory array channels.

4. The memory apparatus of claim 1, wherein said circuitry comprises circuitry to examine patterns of incoming sectors and to mark for distribution among a greater or lesser number of said memory array channels.

5. The memory apparatus of claim 4, wherein said circuitry comprises circuitry to store identifiers for patterns of incoming sectors.

6. The memory apparatus of claim 1, wherein said circuitry comprises circuitry to receive access pattern control signals and to distribute requests to a greater or lesser number of memory array channels in response to access pattern control signals.

7. A memory apparatus, comprising:
a memory array comprising a plurality of memory array channels;
a memory controller configured to receive a memory request and comprising:
a memory port for coupling to said memory array, said memory port comprising a plurality of physical memory channels configured to couple to said memory array and to access said memory array with relatively low latency or relatively high latency and with relatively high throughput or relatively low throughput; and
circuitry to adjust between low latency and low throughput or high latency and high throughput in transferring information through the memory port to said memory array channels of said memory array, wherein said circuitry is capable of determining a number of said plurality of memory array channels through which to distribute said information to service said memory request with low latency and low throughput or high latency and high throughput, said determining being based, at least in part, on a type of said memory request;
wherein said circuitry is capable of increasing said number of memory array channels through which to distribute the memory request to reduce latency or decreasing said number of memory array channels through which to distribute the memory request to increase throughput; and
wherein said circuitry comprises circuitry to distribute requests of a length greater than a threshold value to a lesser number of said memory array channels.

8. The memory apparatus of claim 7, wherein said circuitry comprises circuitry to examine patterns of incoming sectors and to mark for distribution among a greater or lesser number of said memory array channels.

9. The memory apparatus of claim 8, wherein said circuitry comprises circuitry to store identifiers for patterns of incoming sectors.

10. The memory apparatus of claim 7, wherein said circuitry comprises circuitry to receive access pattern control signals and to distribute requests to a greater or lesser number of memory array channels in response to access pattern control signals.

11. The memory apparatus of claim 7, wherein said circuitry comprises circuitry to distribute requests to either a greater or lesser number of said memory array channels according to usage patterns.

12. The memory apparatus of claim 7, wherein said circuitry comprises circuitry to examine incoming requests and to mark an incoming request for distribution among a greater or lesser number of said memory array channels.

13. A memory apparatus, comprising:
a memory array comprising a plurality of memory array channels;
a memory controller configured to receive a memory request and comprising:
a memory port for coupling to said memory array, said memory port comprising a plurality of physical memory channels configured to couple to said memory array and to access said memory array with relatively low latency or relatively high latency and with relatively high throughput or relatively low throughput; and
circuitry to adjust between low latency and low throughput or high latency and high throughput in transferring information through the memory port to said memory array channels of said memory array, wherein said circuitry is capable of determining a number of said plurality of memory array channels through which to distribute said information to service said memory request with low latency and low throughput or high latency and high throughput, said determining being based, at least in part, on a type of said memory request;
wherein said circuitry comprises circuitry to examine patterns of incoming sectors and to mark for distribution among a greater or lesser number of said memory array channels.

14. The memory apparatus of claim 13, wherein said circuitry comprises circuitry to store identifiers for patterns of incoming sectors.

15. The memory apparatus of claim 13, wherein said circuitry comprises circuitry to receive access pattern control signals and to distribute requests to a greater or lesser number of memory array channels in response to access pattern control signals.

16. The memory apparatus of claim 13, wherein said circuitry comprises circuitry to distribute requests to either a greater or lesser number of said memory array channels according to usage patterns.

17. The memory apparatus of claim 13, wherein said circuitry comprises circuitry to examine incoming requests and to mark an incoming request for distribution among a greater or lesser number of said memory array channels.

18. A memory apparatus, comprising:
memory array comprising a plurality of memory array channels;
a memory controller configured to receive a memory request and comprising:
a memory port for coupling to said memory array, said memory port comprising a plurality of physical memory channels configured to couple to said memory array and to access said memory array with relatively low latency or relatively high latency and with relatively high throughput or relatively low throughput; and
circuitry to adjust between low latency and low throughput or high latency and high throughput in transferring information through the memory port to said memory array channels of said memory array, wherein said circuitry is capable of determining a number of said plurality of memory array channels through which to distribute said information to service said memory request with low latency and low throughput or high latency and high throughput, said determining being based, at least in part, on a type of said memory request;

wherein said circuitry comprises circuitry to receive access pattern control signals and to distribute requests to a greater or lesser number of memory array channels in response to access pattern control signals.

19. The memory apparatus of claim 18, wherein said circuitry comprises circuitry to store identifiers for patterns of incoming sectors.

20. The memory apparatus of claim 18, wherein said circuitry comprises circuitry to distribute requests to either a greater or lesser number of said memory array channels according to usage patterns.

21. The memory apparatus of claim 18, wherein said circuitry comprises circuitry to examine incoming requests and to mark an incoming request for distribution among a greater or lesser number of said memory array channels.

* * * * *